(12) United States Patent
Jang et al.

(10) Patent No.: US 7,324,713 B2
(45) Date of Patent: Jan. 29, 2008

(54) APPARATUS FOR AND METHOD OF CONTROLLING OPTICAL INTERFEROMETER

(75) Inventors: Youn Seon Jang, Daejeon (KR); Kwangjoon Kim, Daejeon (KR)

(73) Assignee: Electronics and Telecommunications Research Institute, Daejeon (KR)

(\*) Notice: Subject to any disclaimer, the term of this patent is extended or adjusted under 35 U.S.C. 154(b) by 162 days.

(21) Appl. No.: 11/143,492

(22) Filed: Jun. 3, 2005

(65) Prior Publication Data

US 2006/0133712 A1 Jun. 22, 2006

(30) Foreign Application Priority Data

Dec. 20, 2004 (KR) .................. 10-2004-0108977

(51) Int. Cl.
*G02F 1/225* (2006.01)
*H04B 10/08* (2006.01)
*G02B 26/00* (2006.01)

(52) U.S. Cl. .................. 385/1; 398/162; 398/209; 359/237; 359/288

(58) Field of Classification Search .................. 385/1; 398/162, 209
See application file for complete search history.

(56) References Cited

U.S. PATENT DOCUMENTS

| 4,759,627 A | 7/1988 | Thylen et al. |
| 5,073,331 A | 12/1991 | Shirasaki |
| 5,349,437 A | 9/1994 | Bobb |
| 6,317,247 B1 | 11/2001 | Yang et al. |
| 6,317,526 B1 | 11/2001 | Shirasaki et al. |
| 6,396,605 B1 | 5/2002 | Heflinger et al. |
| 7,061,596 B2 * | 6/2006 | Doerr .................. 356/73.1 |

FOREIGN PATENT DOCUMENTS

| EP | 0337796 | 10/1989 |
| EP | 0967743 | 12/1999 |
| GB | 2163549 | 2/1986 |
| KR | 1020010060734 | 7/2001 |
| KR | 1020020049494 | 6/2002 |

OTHER PUBLICATIONS

International Search Report for EP 05253477.
Eric A. Swanson, et al.; "High Sensitivity Optically Preamplified Direct Detection DPSK Receiver with Active Delay-Line Stabilization"; IEEE Photonics Technology Letters, vol. 6; No. 2; Feb. 1994; pp. 263-265.

\* cited by examiner

*Primary Examiner*—Sung Pak
*Assistant Examiner*—Jerry T. Rahll
(74) *Attorney, Agent, or Firm*—Lowe Hauptman Ham & Berner LLP (57) ABSTRACT

An apparatus and method for controlling an optical interferometer are provided. The method includes setting a thermoelectric cooler (TEC) temperature of the optical interferometer to a room temperature, obtaining an optimal temperature using a difference between two output powers of the optical interferometer based on eye opening of the two output powers and applying an optimal heat voltage generating the optimal temperature to a delay adjuster of the optical interferometer, and performing dithering at the optimal temperature to stabilize the optimal heat voltage.

9 Claims, 8 Drawing Sheets

APPARATUS FOR AND METHOD OF CONTROLLING OPTICAL INTERFEROMETER

This application claims the priority of Korean Patent Application No. 10-2004-0108977, filed on Dec. 20, 2004, in the Korean Intellectual Property Office, the disclosure of which is incorporated herein in its entirety by reference.

BACKGROUND OF THE INVENTION

1. Field of the Invention

The present invention relates to an apparatus for and method of stably controlling an optical interferometer of a receiver in a differential phase shift keying (DPSK) system, and more particularly, to an apparatus for and method of stably controlling a 1-bit delay Mach-Zehnder interferometer (MZI) by automatically and optimally setting a thermoelectric cooler (TEC) and a precision adjustor on one path such that the 1-bit delay MZI has an optimal path difference and by automatically following an optimal point such that the 1-bit delay MZI maintains optimal characteristics regardless of external change such as the change in input power or input wavelength.

2. Description of the Related Art

For optical transmission systems using wavelength division multiplexing (WDM), various types of modulation having better transmission characteristics than conventional nonreturn-to-zero (NRZ) modulation have been suggested. One of those is DPSK. As compared to conventional intensity modulation, the DPSK provides improved receiving sensitivity and is robust to the nonlinearity of optical fiber and is thus suitable for remote transmission.

In DPSK, only phase of an optical signal is modulated with the intensity of the optical signal maintained constant. Accordingly, to directly detect the optical signal using a photodetector in a receiver, it is needed to convert phase modulation into intensity modulation. A device performing this conversion is a 1-bit delay MZI. Since the 1-bit delay MZI has transmission characteristics depending on an input wavelength, a temperature control circuit is essential thereto to adjust and maintain the 1-bit delay of one path. The transmission characteristics of the 1-bit delay MZI vary with a TEC that controls entire module temperature and a precision adjuster that precisely adjusts the length of one path. Even if the 1-bit delay MZI is initially set to have optimal transmission characteristics, it cannot maintain optimal performance when an input wavelength changes due to external changes during operation. Accordingly, to commercialize the 1-bit delay MZI, a method of stably controlling the 1-bit delay MZI by automatically controlling a precise adjuster such that the 1-bit delay MZI initially has the optimal transmission characteristics with respect to channels of a WDM system and by continuously and automatically following values set for the optimal transmission characteristics during operation such that the transmission characteristics do not deteriorate due to external changes is essential.

Many studies have been underway in the field of DPSK but have not reached a commercialization stage yet. In particular, since development of techniques essential to commercialization is under progression, there are not many relevant patents or papers published. In a conventional method of stably controlling an interferometer, a transmitter leaves a part of a carrier component by reducing the magnitude of a modulation drive voltage so that a receiver detects output power of the carrier component and stabilizes a 1-bit delay MZI. However, this conventional method has a poor extinction ratio and depends on input power. Consequently, it is difficult to use the conventional method in commercialized systems.

SUMMARY OF THE INVENTION

The present invention provides an apparatus for and method of stably controlling a 1-bit delay Mach-Zehnder interferometer (MZI) used in a receiving employing differential phase shift keying (DPSK) by automatically and optimally setting a thermoelectric cooler (TEC) and a precision adjustor on one path such that the 1-bit delay MZI has an optimal path difference and by automatically following an optimal point such that the 1-bit delay MZI maintains optimal characteristics regardless of external change such as the change in input power or input wavelength.

According to an aspect of the present invention, there is provided a method of controlling an optical interferometer, including setting a TEC temperature of the optical interferometer to a room temperature, obtaining an optimal temperature using a difference between two output powers of the optical interferometer based on eye opening of the two output powers and applying an optimal heat voltage generating the optimal temperature to a delay adjuster of the optical interferometer, and performing dithering at the optimal temperature to stabilize the optimal heat voltage.

According to another aspect of the present invention, there is provided an apparatus for controlling an optical interferometer, including an optical interferometer receiving a DPSK optical signal and generating a first output and a second output which is a complement of the first output, a delay unit controlling delay time of the second output, a photoelectric converter converting the first output and the second output into electrical signals and outputting a first signal and a second signal, and a control unit receiving the first signal and the second signal and generating a heat voltage for driving the delay unit based on a relationship between the first signal and the second signal.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings. In the drawings, like reference numerals refer to the like elements.

Figure 1:
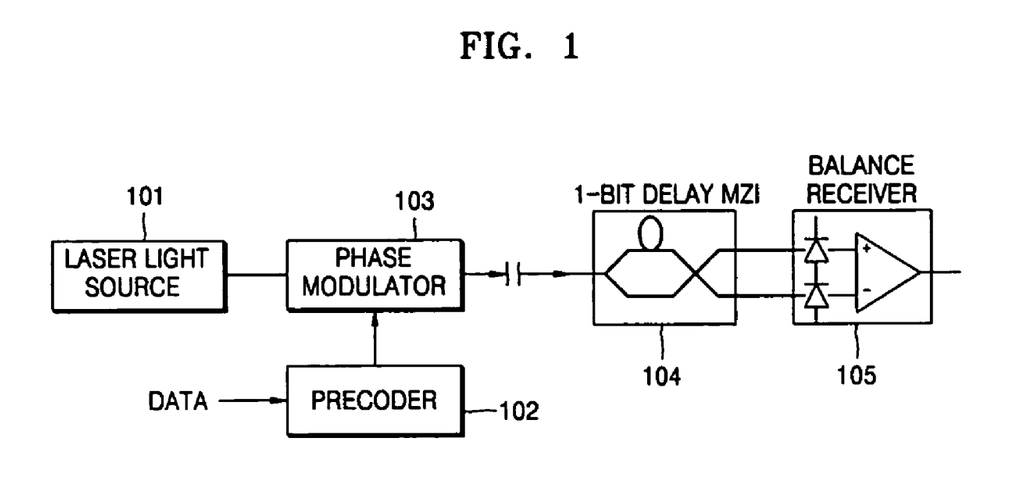
FIG. 1 is a schematic diagram of a differential phase shift keying (DPSK) system according to an embodiment of the present invention.

FIG. 1 illustrates a transmitting unit and a receiving unit in a differential phase shift keying (DPSK) system according to an embodiment of the present invention. The transmitting unit includes a laser light source 101, a precoder 102, and a phase modulator 103. The laser light source 101 is a continuous wave (CW) laser. An optical signal output from the laser light source 101 is modulated in phase. The phase modulator 103 modulates the phase of the optical signal into 0 or π according to a driving signal. Here, the signal driving has been through the precoder 102. The precoder 102 performs coding so that output data of a 1-bit delay Mach-Zehnder interferometer (MZI) 104 in the receiving unit is the same as transmission input data. The receiving unit includes the 1-bit delay MZI 104 and a balance receiver 105. Since a signal subjected to only phase modulation has constant output light intensity, it is necessary to convert the signal from phase modulation into intensity modulation using the 1-bit delay MZI 104 in order to directly detect the signal in the receiving unit. Two output ports of the 1-bit delay MZI 104 are respectively applied to two input ports of the balance receiver 105. Two signals from the two output ports of the 1-bit delay MZI 104 are processed by a differential amplifier. When the balance receiver 105 is used, receiving sensitivity can be increased by about 3 dB compared to a mono receiver.

Figure 2:
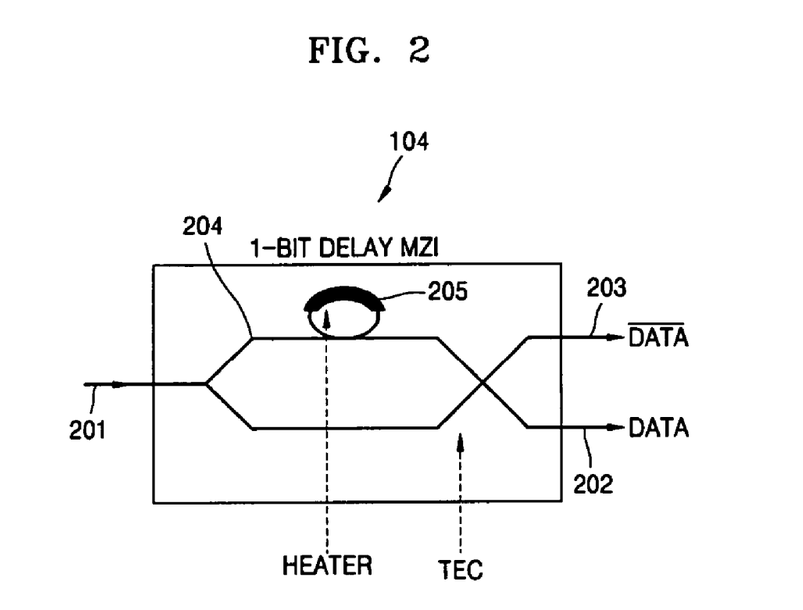
FIG. 2 illustrates the structure of a 1-bit delay Mach-Zehnder interferometer (MZI)

Referring to FIG. 2, a signal 201 input to the 1-bit delay MZI 104 is divided into two paths: a delay path 204 in which data is delayed by 1 bit; and a non-delay path. Thereafter, a 1-bit delayed signal on the delay path 204 is combined with a signal on the non-delay path. The combined signal is output through two output ports: one is a constructive interference port 202; and the other is a destructive interference port 203. The two ports 202 and 203 respectively output first data DATA and a complement of the first data (hereinafter, referred to as "second data") $\overline{\text{DATA}}$. Since the two paths have a delay difference of 1 bit, when a leading bit and a succeeding bit have different phase information (e.g., 0/π or π/0), the constructive interference port 202 outputs a signal of "0". When the leading bit and the succeeding bit have the same phase information (e.g., 0/0 or π/π), the constructive interference port 202 outputs a signal of "1". This is expressed as Equation 1.

$$E_{constructive\ interference\ port}(t) = \frac{1}{2}[e^{j\phi(t)} + e^{j\phi(t-T_d)}]E_{in} \quad (1)$$

-continued
$$= e^{j\left(\frac{\phi(t)+\phi(t-T_d)}{2}\right)}\cos\left(\frac{\phi(t)-\phi(t-T_d)}{2}\right)E_{in}$$

$$I = 1, \text{ for } \phi(t) - \phi(t - T_d) = 0$$

$$= 0, \text{ for } \phi(t) - \phi(t - T_d) = \pi$$

where $T_d$ denotes a delay time occurring in the delay path 204, $\phi(t)$ denotes a phase of an optical signal at an instant of time "t", and I denotes light intensity.

Conversely, when a leading bit and a succeeding bit have different phase information (e.g., 0/π or π/0), the destructive interference port 203 outputs a signal of "1". When the leading bit and the succeeding bit have the same phase information (e.g., 0/0 or π/π), the destructive interference port 203 outputs a signal of "0". To fine-tune 1-bit delay, a precision adjuster 205 is installed on the delay path 204. The precision adjuster 205 may be a heater or a piezoelectric transducer. The entire temperature of the 1-bit delay MZI 104 is set through thermoelectric cooler (TEC) control, and then the temperature of the delay path 204 is controlled using the precision adjuster, i.e., heater 205, so that 1-bit delay is fine-tuned according to a refractive index.

Figure 3:
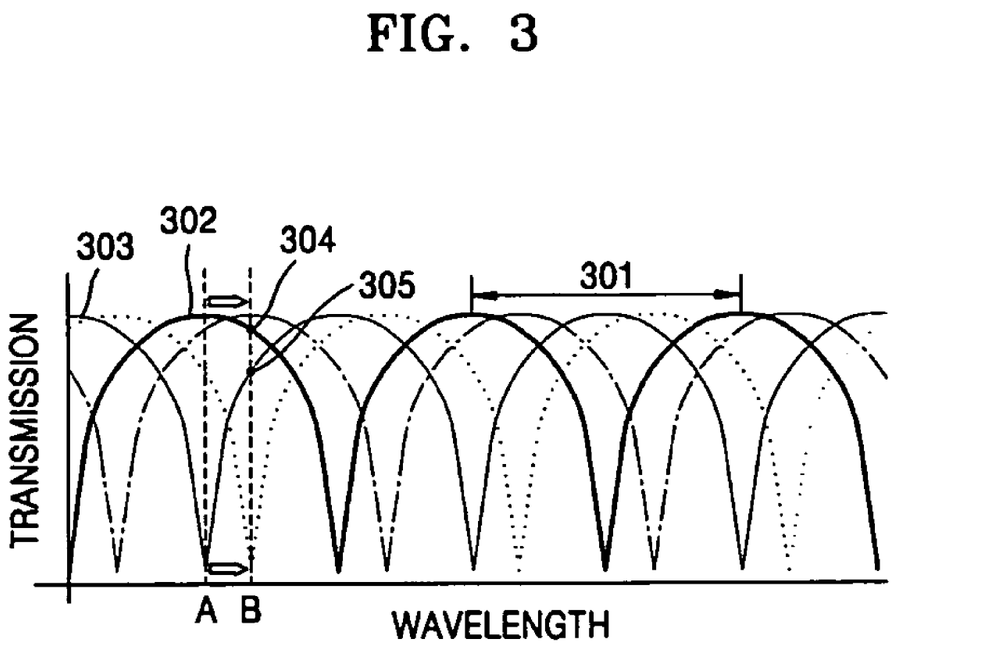
FIG. 3 illustrates the transmission characteristics of the 1-bit delay MZI with respect to continuous wave (CW) light.

FIG. 3 illustrates the wavelength transmission characteristics of the 1-bit delay MZI 104 with respect to CW laser light. The transmission characteristics of the output ports 202 and 203 are expressed as Equation 2.

$$T_{constructive\ interference\ port} \propto \cos^2\left(\frac{\pi n f L_d}{c}\right) \quad (2)$$

$$T_{destructive\ interference\ port} \propto \sin^2\left(\frac{\pi n f L_d}{c}\right)$$

where "n" denotes an effective refractive index of a waveguide in the 1-bit delay MZI 104, and $L_d$ denotes a delay length in the delay path 204 and has a relationship of $nL_d = cT_d$.

Referring to FIG. 3, a period 301 corresponds to a data transmission rate. An output 302 of a constructive interference port and an output 303 of a destructive interference port are offset from each other by half of the period 301. At the point A, the constructive interference port has a highest transmission characteristic while the destructive interference port has a lowest transmission characteristic. The point A shows optimal conditions under which 1-bit delay is tuned exactly with respect to an input wavelength. Here, when DPSK is performed on a CW optical signal, an eye of a received signal has a maximum eye opening as shown in graphs 401 and 402 illustrated in FIG. 4.

In Equation 2, when the delay length in the delay path 204 is set to $L_d$, a transmission characteristic changes according to an input light frequency f. For example, when an input wavelength changes to the point B, an output 304 of the constructive interference port is offset from a highest value. An output 305 of the destructive interference port is also offset from a lowest value. As a result, distortion occurs in a signal as shown in graphs 403 and 404 illustrated in FIG. 4 when DPSK is performed. To compensate for the signal distortion, the delay path 204 must be controlled such that a highest point of an output curve from the constructive interference port and a lowest point of an output curve from the destructive interference port move to the point A.

When a CW or intensity modulated signal is input to the 1-bit delay MZI 104, since an output of the 1-bit delay MZI 104 is given as Equation 2, output light intensity changes according to a wavelength of the input signal. Accordingly, it is easy to control the 1-bit delay MZI 104 using output power. However, when ideal transition between 0 and π occurs between neighboring bits in a DPSK signal, that is, when the transition takes zero time, an average output light intensity of each port of the 1-bit delay MZI 104 is given as a constant as shown in Equation 3.

$$P_{each\ output\ port} = \frac{P_0 + P_1}{2} \propto \frac{\sin^2\left(\frac{\pi n f L_d}{c}\right) + \cos^2\left(\frac{\pi n f L_d}{c}\right)}{2} = Const. \quad (3)$$

where $P_{each\ output\ port}$ denotes an average light intensity of each output port of the 1-bit delay MZI 104, $P_0$ denotes a light intensity at a "0" level, and $P_1$ denotes a light intensity at a "1" level. The sine term results from the change of the cosine term due to a modulated phase difference "π".

In other words, even if the wavelength of an input signal changes, the average output light intensity of each port of the 1-bit delay MZI 104 does not change. Accordingly, in case of phase modulation, the 1-bit delay MZI 104 cannot be optimally driven only by measuring the average output light intensity of each port. For this reason, a method, for example, of enabling a transmitting unit to leave a part of a carrier component is used in conventional technology of stably controlling an optical interferometer using output light intensity. Moreover, stabilization control technology that can be commercialized has not been suggested.

Figure 4:
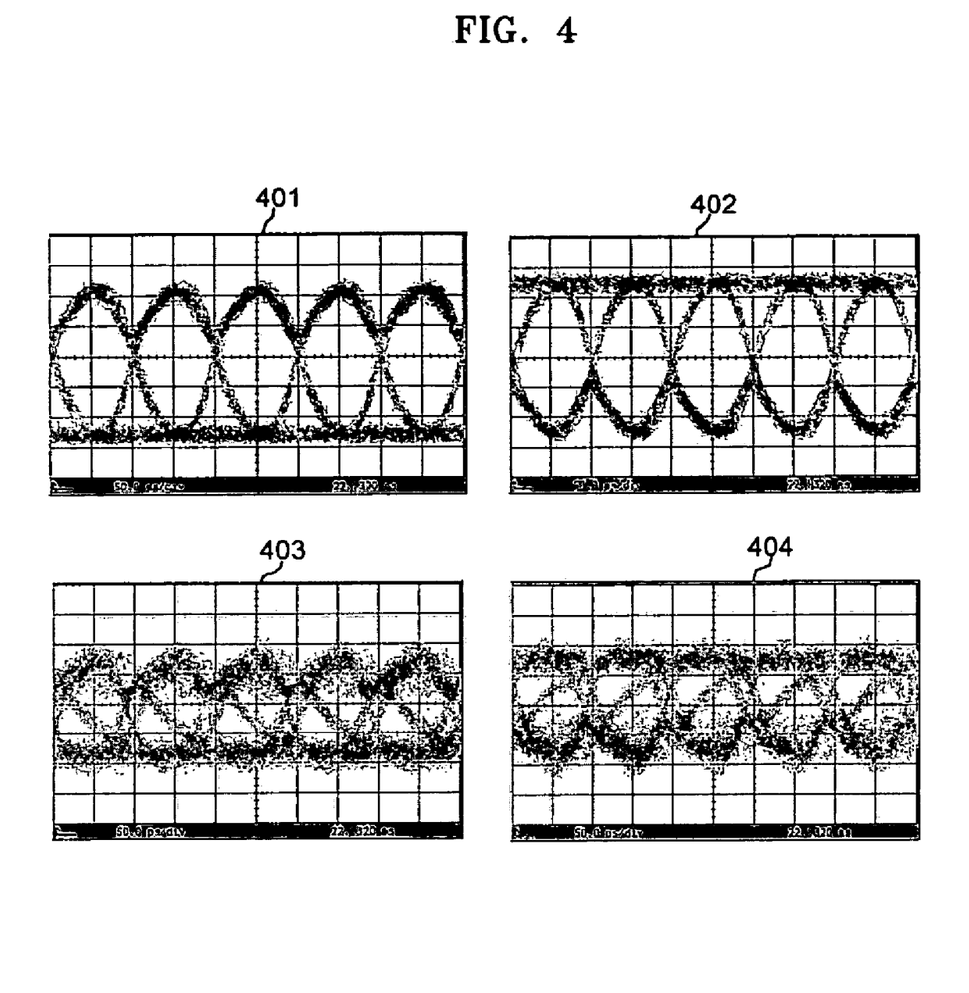
FIG. 4 shows eye diagrams of the output of the 1-bit delay MZI when nonreturn-to-zero differential phase shift keying (NRZ-DPSK) is used.

The present invention provides a method of controlling temperature by feeding back the output power of an interferometer based on the asymmetry of eye opening in a nonreturn-to-zero-DPSK (NRZ-DPSK) signal. In an actual NRZ-DPSK signal, finite time is taken for transition between 0 and π due to a finite bandwidth of a modulator, and therefore, asymmetry occurs in eye opening as shown in FIG. 4. The output 402 of the constructive interference port contains a direct current (DC) component at the "1" level but does not contain a DC component at the "0" level. In other words, when the "0" level is continued, a pattern in which increasing light intensity turns to decrease at an intersection of bits appears. Even when a driving point is offset from an optimal point, this pattern remains as shown in the graph 404. Conversely, in the destructive interference port, a DC component does not exist at the "1" level. A "0" level DC component does not exist in the constructive interference port because a phase difference must be continuously changed between 0 and π to continue the "0" level and the change therebetween takes finite time, that is, a phase difference becomes to have a value between 0 and π, and therefore, light intensity cannot be maintained at 0. For the same reason, a "1" level DC component does not exist in the destructive interference port.

Figure 6:
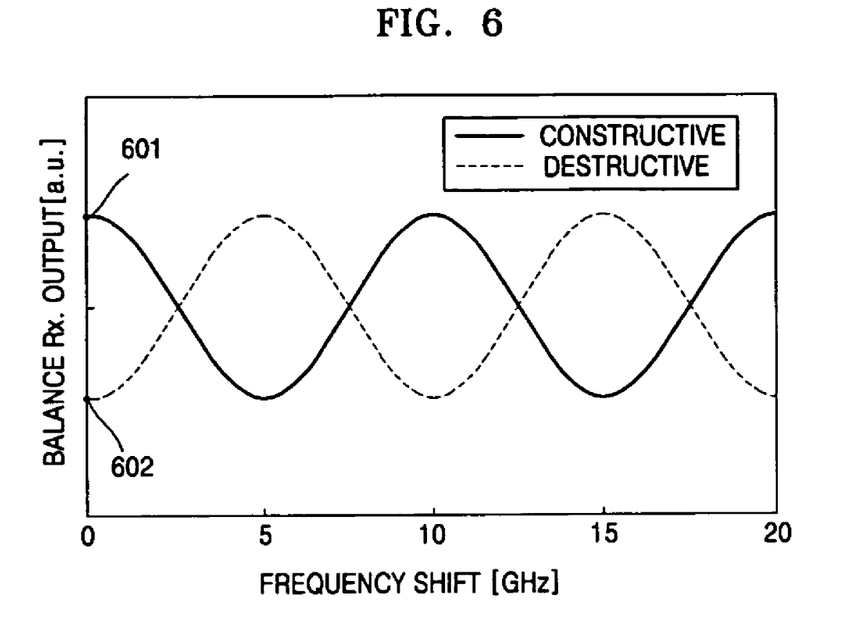
FIG. 6 is a graph illustrating two output powers of a 1-bit delay MZI according to the change in an input wavelength when DPSK is performed.
Figure 7:
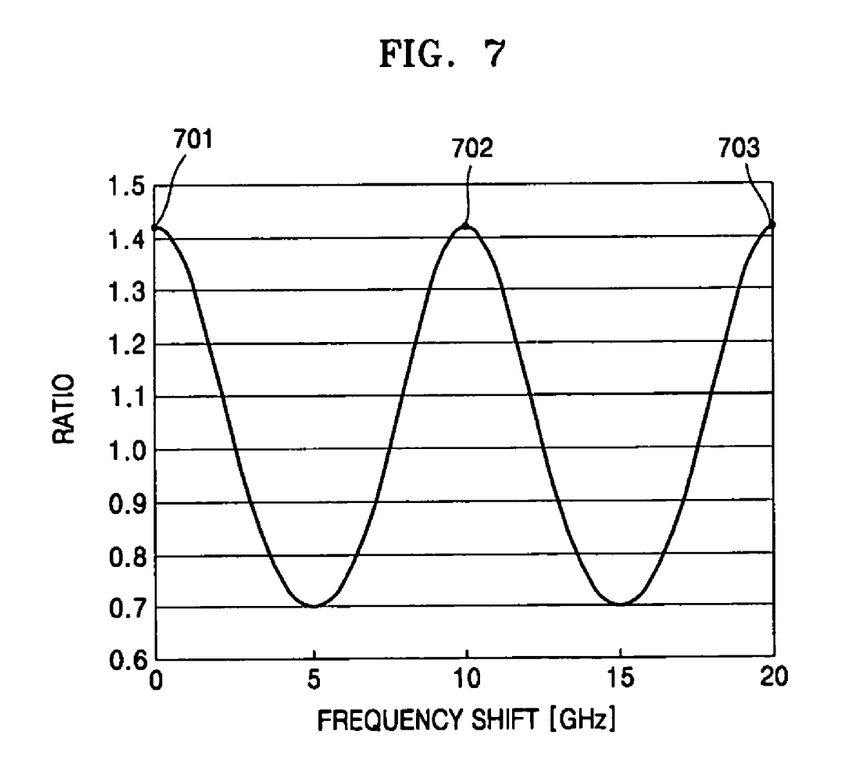
FIG. 7 is a graph of an output power ratio of a 1-bit delay MZI versus frequency shift when DPSK is performed.

Due to a DC component asymmetrically appearing at one level, unlike the prediction of Equation 3, the output power of an interferometer is not maintained at the constant but changes in proportion to a DC level according to a wavelength as shown in FIG. 6. A an optimal driving point, the DC component appears at a highest point (see the graph 402) in the constructive interference port and at a lowest point (see the graph 401) in the destructive interference port. Accordingly, output power curves of the respective constructive and destructive interference ports have a highest value 601 and a lowest value 602, respectively. When the wavelength of an input signal changes, eye opening is reduced and signal distortion occurs, as shown in the graphs 403 and 404, and simultaneously, a DC component of the constructive interference port gradually decreases while a DC component of the destructive interference port gradually increases. Referring to FIGS. 6 and 7, points 701, 702, and 703 where a difference between the output of the constructive interference port and the output of the destructive interference port is biggest coincide with an optimal driving point of a 1-bit delay MZI. Accordingly, stabilization control can be easily performed using the output power ratio of a balance receiver.

Figure 5:
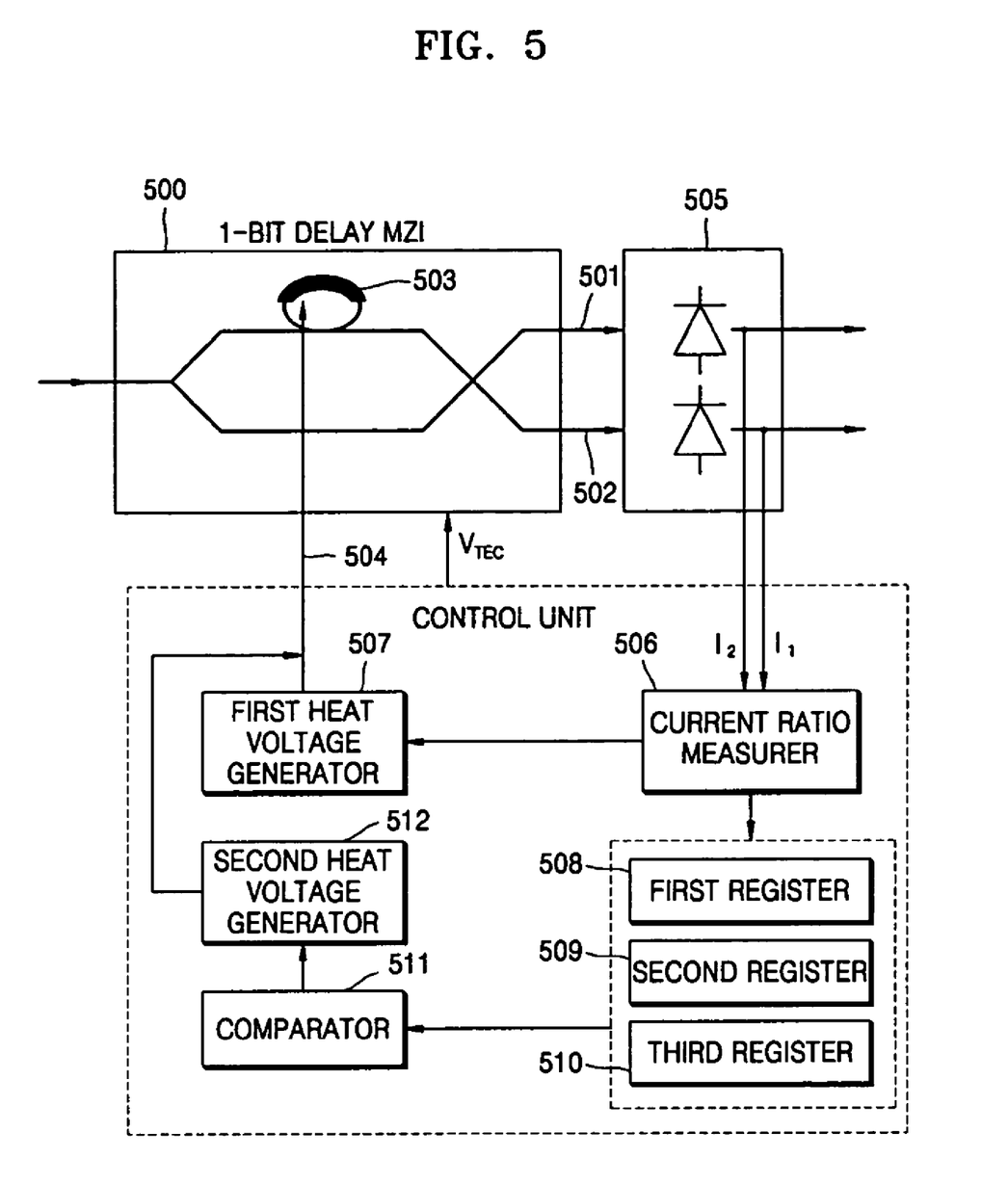
FIG. 5 illustrates a structure for automatically detecting optimal conditions for a 1-bit delay MZI and stably controlling the 1-bit delay MZI, according to an embodiment of the present invention.

An apparatus for stably controlling a 1-bit delay MZI according to an embodiment of the present invention will be described with reference to FIG. 5. Two outputs 501 and 502 of a 1-bit delay MZI 500 are applied to two input ports of a balance receiver 505. Here, current flowing in the balance receiver 505 is proportion to a DC component of an output signal from the 1-bit delay MZI 500. The 1-bit delay MZI 500 is controlled for two purposes: for automatically finding an optimal point (the point 701 shown in FIG. 7); and for maintaining the optimal point regardless of external changes such as the changes in a wavelength and temperature. Referring to FIG. 6, the optimal point of the 1-bit delay MZI 500 corresponds to a point where the difference between two outputs of the balance receiver 505 is biggest. Accordingly, when two output port values of the balance receiver 505 that are illustrated in FIG. 6 are used, a current ratio $$\frac{I_{Constructive}}{I_{Destructive}}$$

is obtained like FIG. 7. The points 701, 702, and 703 where the current ratio is biggest coincide with the optimal point of the 1-bit delay MZI 500. In other words, by finding a point where the difference between two outputs of the balance receiver 505 is biggest, the optimal point can be found. Therefore, a control apparatus according to an embodiment of the present invention is structured as shown in FIG. 5. The difference between current ratios between two outputs of the balance receiver 505 is measured, and a heat voltage 504 of a precision adjuster 503, i.e., a heater, which adjusts a delay path of the 1-bit delay MZI 500, is set. In other words, the heat voltage 504 is adjusted to give a biggest current ratio.

In detail, a current ratio measurer 506 receives two output currents $I_1$ and $I_2$ from the balance receiver 505 and measures and outputs a current ratio therebetween. A first heat voltage generator 507 receives the current ratio and sets a heat voltage for the precision adjuster 503 to give a maximum current ratio. In this situation, the heat voltage is gradually increased by $\Delta V$, and a current ratio is measured at every increase. In a predetermined section, e.g., in a section of +/−10%, with respect to an optimal heat voltage obtained through these increasing and measuring operations, the heat voltage is more finely increased to find a value giving a maximum current ratio. The heat voltage giving the maximum current ratio is generated to adjust the heater, i.e., the precision adjuster 503.

In fine tuning, a current ratio at a current heat voltage is stored in a first register 508. A current ratio obtained when temperature is changed by $-\Delta T$ is stored in a second register 509. A current ratio obtained when the temperature is changed by $+\Delta T$ is stored in a third register 510. A comparator 511 receives the current ratios from the respective first through third registers 508, 509, and 510, detects a location corresponding to a maximum current ratio, and outputs the location to a second heat voltage generator 512. Then, the second heat voltage generator 512 fine tunes the heat voltage.

Figure 8:
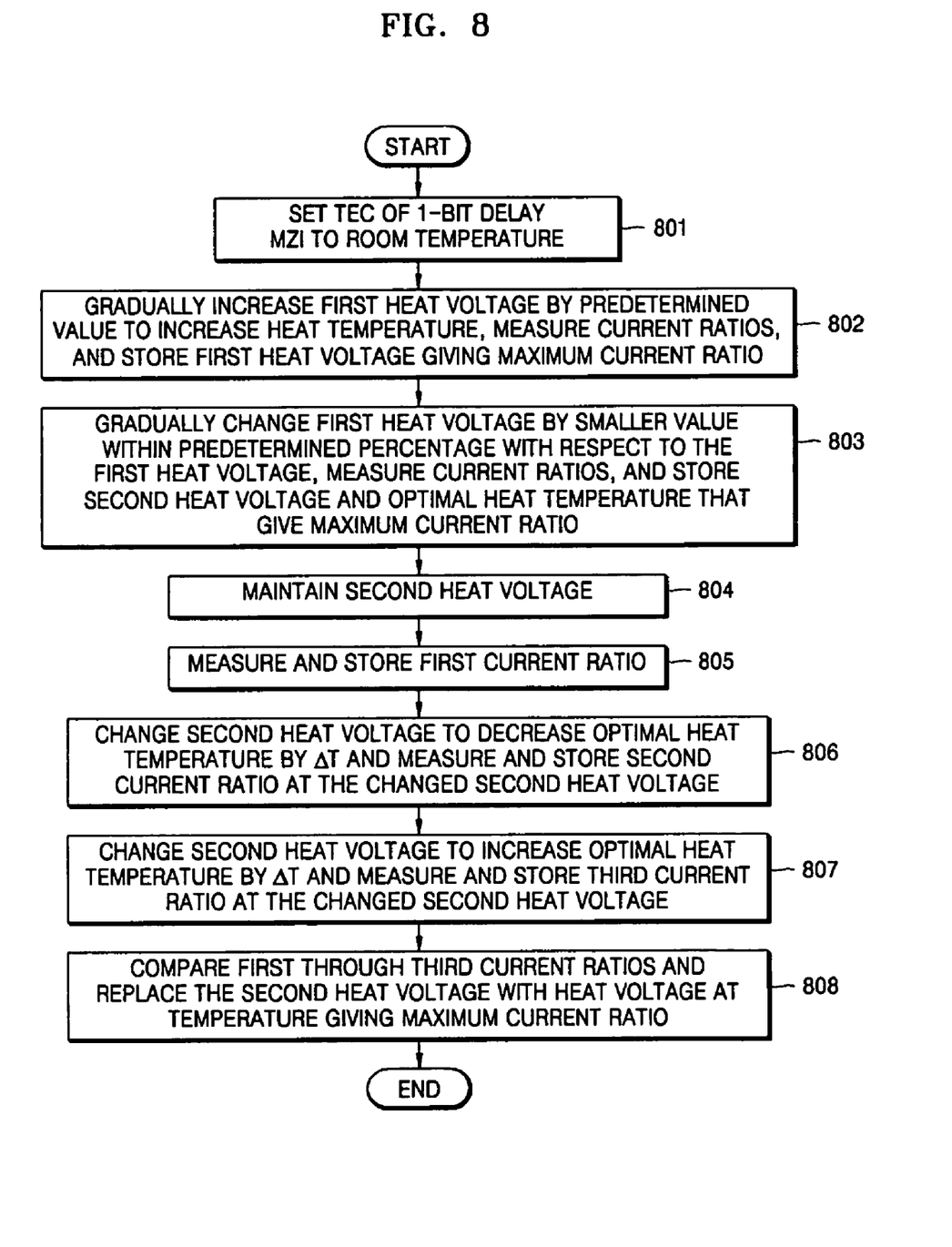
FIG. 8 is a flowchart of a control method according to an embodiment of the present invention.

A control method according to an embodiment of the present invention will be described based on the above-described basic control principle. The control method may be divided into three stages: an initial maximum detection routine (operation 802), a secondary maximum detection routine (operation 803), and a stabilization routine (operations 804 through 808). A procedure for automatically setting an optimal heat temperature for the precision adjustor, i.e., heater 503 to find an optimal point of the 1-bit delay MZI 500 is performed in two stages, i.e., the initial maximum detection routine and the secondary maximum detection routine because there is a limit in a heat voltage resolution $\Delta V$ that can control the heater 503 according to the number of bits in analog-to-digital (A/D) conversion.

In operation 801, temperature for a TEC is set to control the temperature of the entire 1-bit delay MZI 500 to be stabilized without being affected by external temperature.

Next, to find an optimal heat temperature, at an optimal point in FIG. 6 where a ratio of the output 601 of the constructive interference port to the output 602 of the destructive interference port is maximum, a control voltage proportional to a current ratio between two outputs of the balance receiver 505 is measured and used by a control unit to set a heat voltage. In detail, to find the optimal heat temperature, the two detection stages are performed. In the initial maximum detection routine (operation 802), a heat voltage is gradually increased by $\Delta V$, a current ratio is measured at every increase, and a heat voltage (i.e., a first heat voltage) given at a maximum current ratio is stored. For more precise temperature control, in the secondary maximum detection routine (operation 803), the heat voltage is more finely increased in a predetermined section, e.g., within +/−10%, with respect to the first heat voltage, a current ratio is measured at every increase, and a heat voltage (i.e., a second heat voltage) given at a maximum current ratio and an optimal heat temperature given at this time are stored. Through the secondary maximum detection routine, the optimal heat temperature can be more precisely obtained.

In operation 804, the second heat voltage is maintained.

Next, a procedure for automatically following an optimal heat temperature according to an external change such as the change in an input wavelength will be described.

Referring to FIG. 6, at an initial point (Frequency shift=0), the 1-bit delay MZI 500 is at an optimal point where outputs of the constructive interference port and the destructive interference port are located a highest point and a lowest point, respectively. However, as the input wavelength changes, the outputs of the two ports also change. If a current ratio is measured when the outputs of the two ports change, the current ratio gradually decreases as shown in FIG. 7. Therefore, it can be inferred that a current ratio is maximum at the optimal point. Accordingly, after an optimal heat temperature is set, an increase/decrease of a heat voltage by a value corresponding to a predetermined temperature is dithered, and current ratios are measured. In operation 805, a first current ratio is measured at a current temperature, i.e., the optimal heat temperature, and stored in the first register 508. In operation 806, a second current ratio is measured when the optimal heat temperature is changed by −$\Delta T$ and stored in the second register 509. In operation 807, a third current ratio is measured when the optimal heat temperature is changed by +$\Delta T$ and stored in the third register 510. In operation 808, the first through third current ratios are compared, and the optimal heat temperature is reset based on a maximum current ratio. If not the first current ratio but the second or third current ratio is maximum, the input wavelength has changed a little. Accordingly, the optimal heat temperature is reset according to the changed input wavelength in operation 808.

Figure 9:
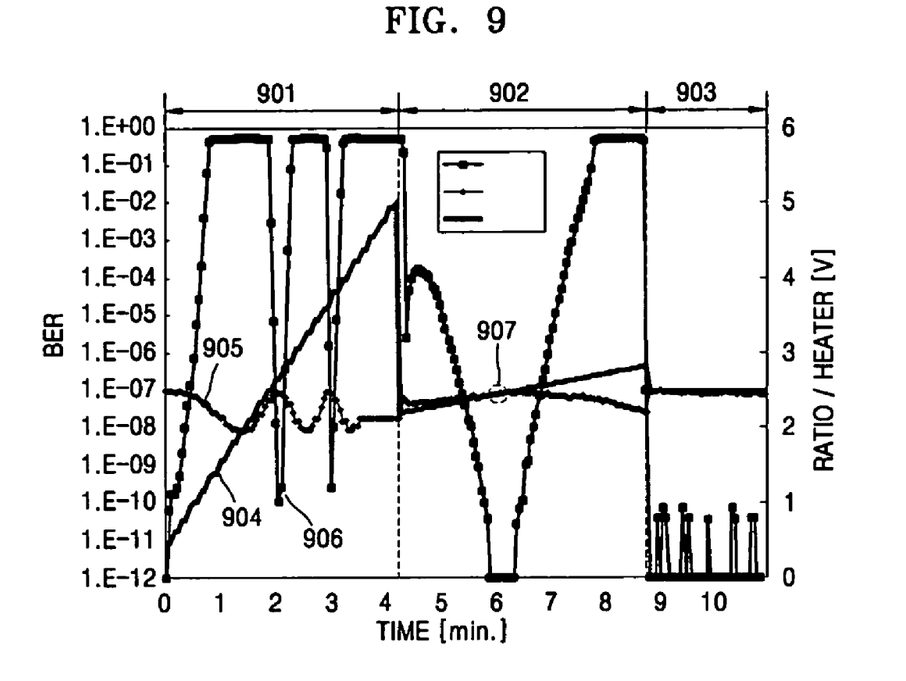
FIG. 9 illustrates the results obtained by using a circuit embodied according to the present invention.

FIG. 9 illustrates the results obtained by using a circuit embodied according to the present invention. The initial maximum detection routine is performed in a range 901 in which a current ratio 905 is measured as a heat voltage 904 is gradually increased. It is inferred that a bit error rate (BER) 906 is best at peaks of the current ratio 905. With respect to a middle one among the peaks of the current ratio 905, the secondary maximum detection routine is performed in a range 902. Here, a heat voltage having a maximum current ratio is set as an optimal voltage 907. Accordingly, the first purpose of automatically finding an optimal point (701 in FIG. 7) is achieved. The stabilization routine is performed in a range 903 in which dithering is performed with respect to the optimal voltage 907.

Figure 10:
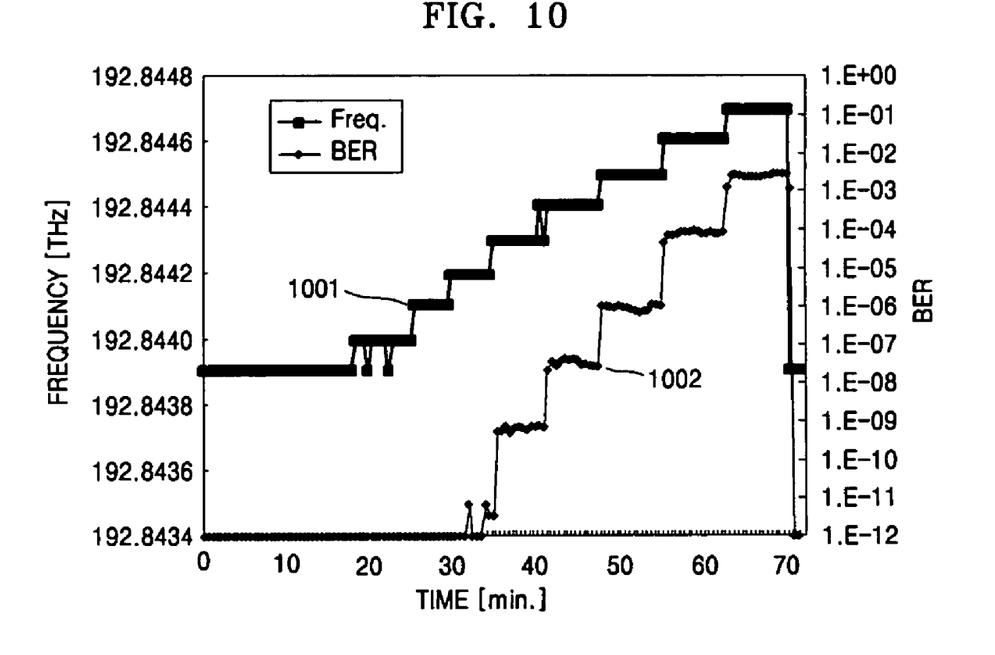
FIG. 10 is a graph illustrating the results of measuring a bit error rate (BER) according to the change in an input wavelength when a stabilization routine is performed.
Figure 11:
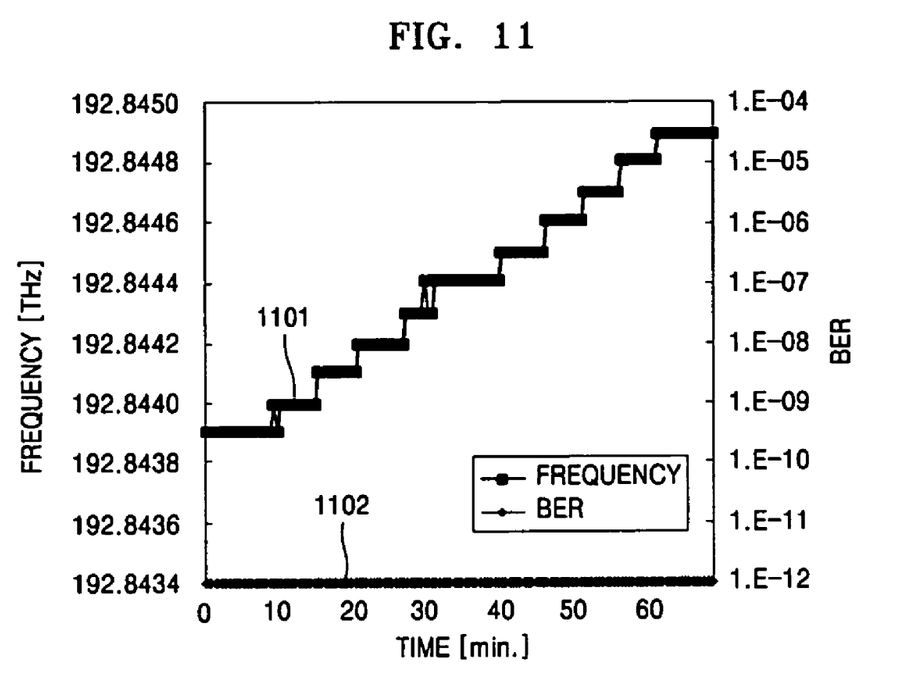
FIG. 11 is a graph illustrating the results of measuring a BER according to the change in an input wavelength when the stabilization routine is performed.
Figure 12:
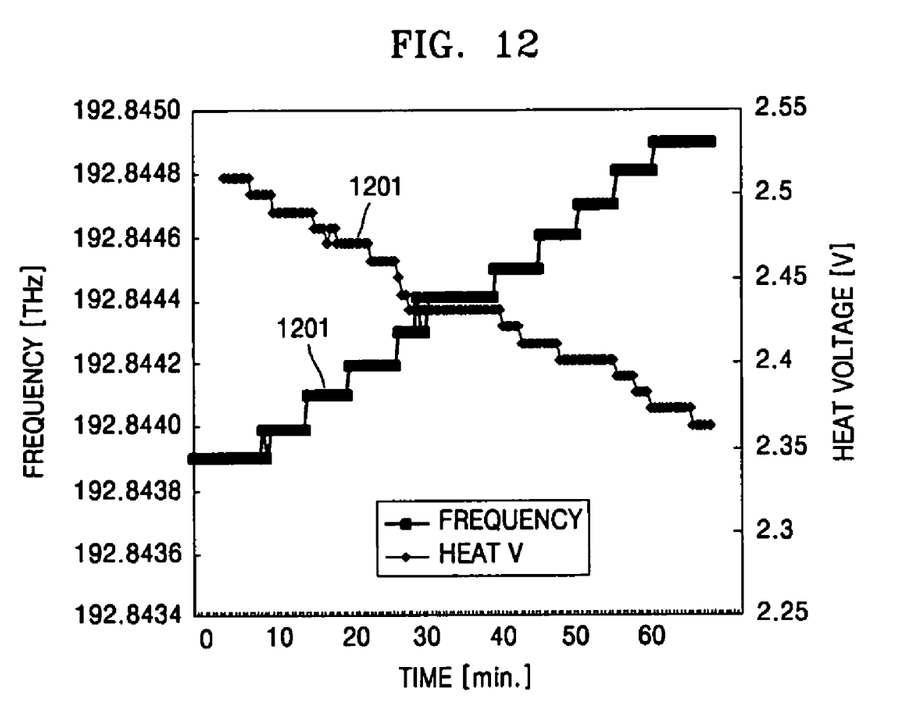
FIG. 12 is a graph illustrating the results of measuring a heat voltage according to the change in an input wavelength when the stabilization routine is performed.

FIG. 10 is a graph illustrating the results of measuring a BER 1002 according to the change in a frequency 1001 of a signal when the stabilization routine is not performed after an optimal heat voltage is detected in the secondary maximum detection routine. Referring to FIG. 10, as the frequency 1001 changes, the BER 1002 increases. FIG. 11 is a graph illustrating the results of measuring a BER 1102 according to the change in a frequency 1101 when the stabilization routine is performed under the same conditions as used for the graph shown in FIG. 10. Referring to FIG. 11, even when the frequency 1101 shifts by 1 GHz, the BER 1102 is maintained without an error. Here, as shown in FIG. 12, an optimal heat voltage 1202 is automatically changed by dithering according to the change in a frequency 1201. The optimal heat voltage 1202 is shifted by about 0.15 V with respect to a shift of 1 GHz in the frequency 1201. Since the circuit embodied according to the present invention can provide a sufficient heat voltage to control a shift of several GHz in a light frequency, the present invention can provide a satisfactory stabilization range. Accordingly, it is possible to automatically following an optimal temperature according to the change in external conditions such as the change in an input wavelength.

A method of controlling an optical interferometer according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, hard disks, floppy disks, flash memory, optical data storage devices, and carrier waves (such as data transmission through the Internet). The computer readable recording medium can also be distributed over network coupled computer systems so that the computer readable code is stored and executed in a distributed fashion. Also, a font ROM data structure according to the present invention can also be embodied as computer readable codes on a computer readable recording medium like ROM, RAM, CD-ROM, a magnetic tape, a hard disk, a floppy disk, flash memory, or an optical data storage device.

As described above, the present invention provides a method of controlling a 1-bit delay MZI used in a receiving unit in a transmission system using DPSK to have optimal transmission characteristics. Since the present invention provides a method of automatically finding an optimal value, inconvenience of always setting the optimal value manually when the system is installed is eliminated. In addition, the present invention provides a method of automatically following the optimal value according to the change in an input wavelength, thereby greatly enhancing the stabilization of system performance, which is essential to commercialization. Compared to the conventional methods, the present invention is independent of input power and does not affect signal characteristics. In addition, since the present invention uses the structure of an existing receiving unit as it is, it is economical.

What is claimed is:

1. A method of controlling an optical interferometer, comprising:
    (a) setting a thermoelectric cooler (TEC) temperature of the optical interferometer to a room temperature;
    (b) obtaining an optimal temperature using a difference between two output powers of the optical interferometer based on eye opening of the two output powers and applying an optimal heat voltage generating the optimal temperature to a delay adjuster of the optical interferometer, the heat voltage based on the proportion of a current ratio between the two output powers; and
    (c) performing dithering at the optimal temperature to stabilize the optimal heat voltage.

2. The method of claim 1, wherein operation (b) comprises: gradually changing the optimal heat voltage by a predetermined value and measuring a first output and a second output which is a complement of the first output at each change; obtaining current ratios between the first output and the second output; and setting a heat voltage at a maximum current ratio as the optimal heat voltage.

3. The method of claim 2, wherein the setting of the heat voltage comprises: setting a voltage section to a range between the optimal heat voltage and a voltage higher or lower than the optimal heat voltage by a predetermined value; gradually changing a heat voltage within the voltage section and obtaining a current ratio between the first output and the second output at each change; and setting a voltage giving a maximum current ratio as the optimal heat voltage.

4. The method of claim 1, wherein operation (c) comprises: obtaining a first current ratio at the optimal temperature; obtaining a second current ratio after adjusting the optimal heat voltage to increase the optimal temperature by a predetermined value; obtaining a third current ratio after adjusting the optimal heat voltage to decrease the optimal temperature by a predetermined value; and comparing the first through third current ratios with one another and resetting the optimal heat voltage to a heat voltage generating a maximum current ratio among the first through third current ratios.

5. The method of claim 1, wherein the optical interferometer is a 1-bit delay Mach-Zehnder interferometer used as a demodulator in a receiving unit of a nonreturn-to-zero differential phase shift keying (NRZ-DPSK) system.

6. An apparatus for controlling an optical interferometer, comprising:
    an optical interferometer receiving a differential phase shift keying (DPSK) optical signal and generating a first output and a second output which is a complement of the first output;
    a delay unit controlling delay time of the second output;
    a photoelectric converter convening the first output and the second output into electrical signals and outputting a first signal and a second signal; and
    a control unit receiving the first signal and the second signal and generating a heat voltage for driving the delay unit based on a relationship between the first signal and the second signal;
    wherein the control unit further comprises a current ratio measurer measuring a current ratio between the first signal and the second signal; and a first heat voltage generator generating the heat voltage proportional to the current ratio.

7. The apparatus of claim 6, wherein the optical interferometer is a 1-bit delay Mach-Zehnder interferometer.

8. The apparatus of claim 6, wherein the control unit comprises: a current ratio measurer measuring a current ratio between the first signal and the second signal; and a first heat voltage generator generating the heat voltage proportional to the current ratio.

9. The apparatus of claim 8, wherein the control unit further comprises: a first register storing a first current ratio obtained at present; a second register storing a second current ratio obtained after a temperature of the delay unit is increased by a predetermined value; a third register storing a third current ratio obtained after the temperature of the delay unit is decreased by a predetermined value; and a second heat voltage generator reading the first through third current ratios from the first through third registers, detecting a maximum current ratio among the first through third current ratios, and generating a heat voltage corresponding to the maximum current ratio.

* * * * *